N. H. HILLER.
METHOD OF EVAPORATION AND APPARATUS THEREFOR.
APPLICATION FILED JAN. 11, 1909.
1,071,740.
Patented Sept. 2, 1913.
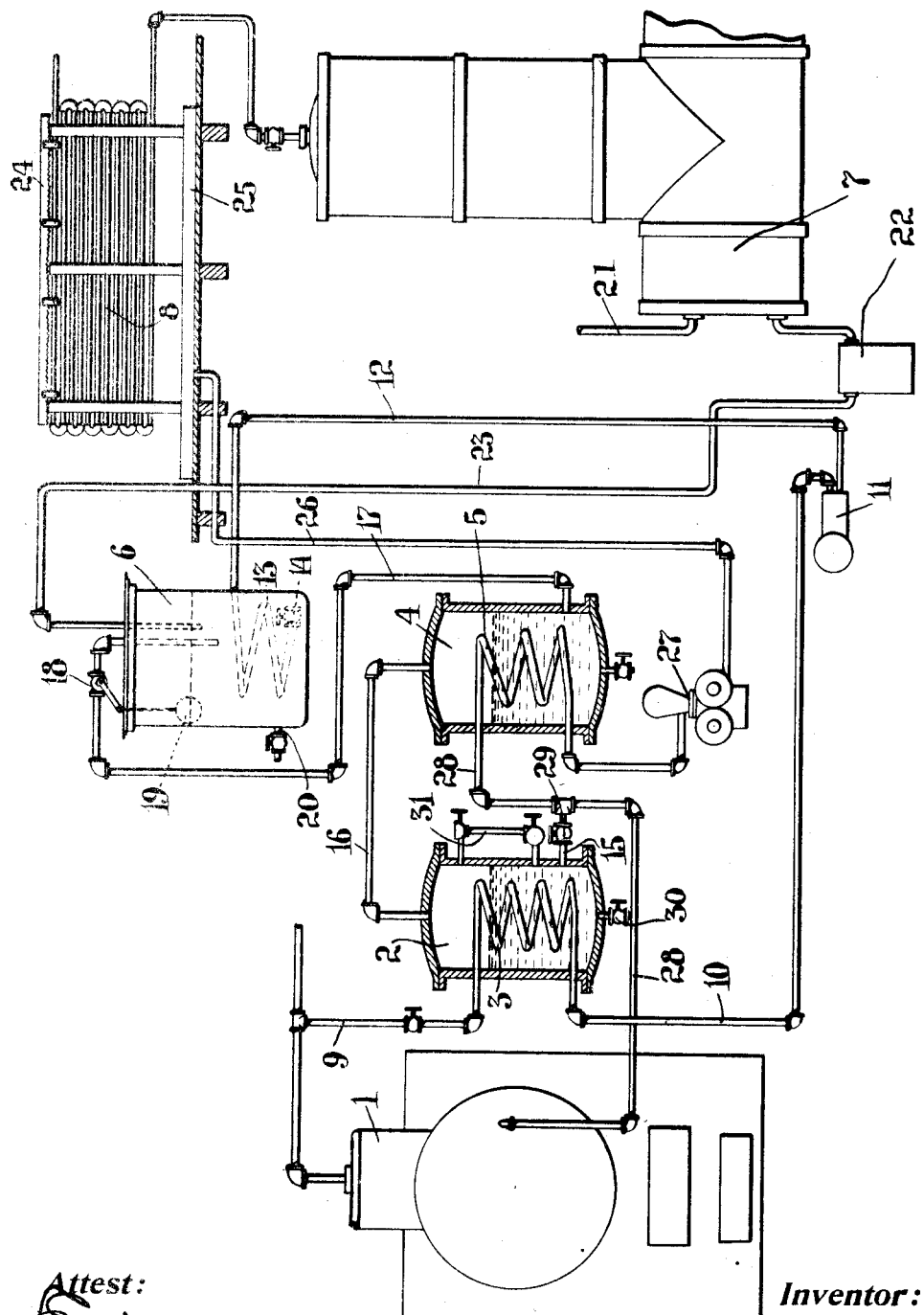
Attest:
Inventor:
N. H. Hiller
by
Attys

UNITED STATES PATENT OFFICE.

NICOLAI H. HILLER, OF CARBONDALE, PENNSYLVANIA.

METHOD OF EVAPORATION AND APPARATUS THEREFOR.

1,071,740.  Specification of Letters Patent.  Patented Sept. 2, 1913.

Application filed January 11, 1909. Serial No. 471,652.

*To all whom it may concern:*

Be it known that I, NICOLAI H. HILLER, a citizen of the United States of America, and a resident of Carbondale, Lackawanna county, Pennsylvania, have invented a certain new and useful Method of Evaporation and Apparatus Therefor, of which the following is a specification.

My invention relates to a method of evaporation and apparatus therefor, and is particularly intended for the production of pure distilled water such as is desired for the making of artificial ice, but is also applicable to the production of drinking water on ship board and elsewhere, where purification of water by distillation is desired, also for the distillation of other liquids.

My invention comprises distillation and condensation of water or other liquid under pressure such that the cooling liquid employed in the condensation may itself be at a high temperature, for example, at a temperature above its boiling point at atmospheric pressure.

Further features of my invention will be pointed out hereafter.

In the production of pure water for ice making, it is found that oftentimes mere evaporation and condensation of the water so as to produce ordinary distilled water, is not sufficient, as such distilled water is apt to contain various dissolved gases which impart to the water, and to the ice made therefrom, a disagreeable taste. To obviate this it is customary to heat and agitate the water, after condensation, to drive off such dissolved gases; such step being commonly termed reboiling, although only a portion of the distilled water is, in practice, reevaporated, the heat and agitation due to the boiling off of a portion of the water, sufficing to carry off the dissolved gases. The cooling water required for condensation, when condensation is conducted at or about atmospheric pressure, is also in many cases, a considerable item of expense. When the distillation and condensation is conducted in connection with ice plants there are usually considerable quantities of warm water which are available for use as cooling water in condensers, especially if the condensation be conducted under pressure; for example, in compression refrigeration plants, the water circulated through the jackets of the compression cylinders is available for this purpose; in absorption refrigeration plants, the cooling water from the rectifier or condenser by which the ammonia or other refrigerant is cooled down, is available for this purpose; and in the case of condensing steam engines, such as commonly used on ship board for example, the water from the hot well is available. Not only does the use of this warm water in the condenser economize the use of water in the plant, but the cooling water from the condenser is of course discharged at a higher temperature than that at which it enters, and is therefore the more suitable for use as boiler feed water, and for other purposes for which hot water is desired.

The objects of my invention are therefore, to render the evaporation of water and other liquids more economical, to economize in the use of cooling water in such evaporating apparatus, and to make the apparatus simple, compact, economical and relatively inexpensive.

I will now proceed to describe my invention with reference to the accompanying drawing, in which I have indicated more or less diagrammatically, and with certain of the parts shown in central vertical section, one form of distilling apparatus embodying my invention and have shown in connection therewith certain parts of absorption refrigeration apparatus, these parts being shown as a diagrammatic representation of a source of supply of warm water adapted for use as cooling water in the condenser when the same is operated under pressure as herein described.

In the drawing 1 designates a boiler in which the water to be purified is initially evaporated, 2 designates an evaporator in which water is evaporated by the heat of steam passing from the boiler 1 through a pipe coil 3 in such evaporator 2, and 4 designates a condenser in which the steam or other gas or vapor produced in evaporator 2 is condensed by the cooling action of water circulated through a pipe coil 5 in this condenser.

6 designates a reboiler into which the water or other liquid condensed in condenser 4, and the water condensed in heating coil 3 of evaporator 2, are delivered.

7 designates the still or generator of an absorption refrigeration plant, and 8 the rectifier of such a plant. The plant also comprises suitable pipes, valves, etc., as hereinafter described. In the operation of this plant, steam from boiler 1 is conveyed under pressure—for example, one hundred pounds pressure, corresponding to a temperature of about 338° F., through pipe 9 to the heating coil 3 in evaporator 2, this evaporator being maintained under pressure due to the evaporation of the liquid within it—for example, being maintained under a pressure of about 70 lbs., corresponding to a temperature of about 316° F. The steam so supplied to coil 3 will be condensed therein, as a result of imparting its heat to the liquid surrounding said coils, and will then be conveyed through a pipe 10 to a suitable trap 11. In the case of a pure water plant, such as herein described, (and the description hereafter will be with reference to a pure water plant, it being understood as stated that the general principles of the invention are applicable also to the evaporation and condensation of other liquids) the condensed water will be discharged from this trap into a pipe 12, leading to a coil 13 within the reboiler 6, said coil being provided with a valve 14 or other suitable means for restricting the flow of water through the coil, so that the water in said coil may be maintained at a pressure above that of the atmosphere and at a corresponding temperature. The water is discharged from this valve 14 or other flow restricting device, into the reboiler 6, this reboiler being maintained customarily at or above atmospheric pressure, so that the water so discharged into the reboiler evaporates in the reboiler to a greater or less extent, and by its evaporation and consequent agitation of the water in the reboiler, effects the "reboiling" operation by which the dissolved gases in such water are driven off.

Water is supplied to the evaporator 2, through a feed connection 15, the feeding water being derived from a source hereinafter referred to. Such water is evaporated in said evaporator by the heat from coil 3, as previously explained, the steam being conducted through pipe 16 to the condenser 4, where it is condensed through the chilling action of the water circulating through pipe coil 5, the condensed water being conveyed by pipe 17 to the reboiler 6. In this pipe 17 I customarily provide a valve 18 operated by a float 19 in the reboiler, so that said valve 18 is opened automatically when the level of the water in reboiler 6 falls below a predetermined level; and is closed automatically when the level of the water in said reboiler rises above another predetermined level. The reboiler is provided with the customary draw off connection 20 for carrying away the purified water.

In the stills or generators of absorption refrigeration apparatus, evaporation is usually conducted by steam supplied from a suitable source, as for example, by pipe 21, the water condensed in the generator passing to a suitable trap 22. This condensed water is of course ordinarily as suitable for use in ice making as is the water from the heating coil 3 of the evaporator, and hence this water is customarily conveyed from the trap through a pipe 23 to the reboiler.

The so-called rectifier of absorption refrigeration apparatus usually comprises a pipe coil through which the ammonia or other refrigerant evaporated in the still or generator, is passed, this pipe coil being cooled by water discharged from a suitable spraying device 24 over the pipe coils, such water being collected in a trough 25; the water is of course heated in passing over the pipe coils and customarily is heated to such extent as to be unsuitable for use as cooling water in a condenser operated at atmospheric pressure. It is, however, entirely suitable for use in a condenser operated under pressure, according to my invention, and hence I convey this water from the trough 25 through a pipe 26 to the cooling coil 5 of the condenser 4; a pump 27, or other equivalent device being provided if necessary to deliver the water to the coil 5. This pump may be the feed water pump of the boiler 1. The water, in passing through the coil 5 of the condenser, will be heated considerably, and in the instance assumed may be supposed to be heated to as high a temperature as 297° F., corresponding to a pressure much above that of the atmosphere. This water is then conveyed by a pipe 28 to the boiler feed connection, the feed connection 15 of the evaporator 2, being connected to this pipe 28 through a suitable valve 29. I also supply, for convenience, a draw off connection 30 from the evaporator 2, leading to this pipe 28.

31 designates a gage glass, with which the evaporator 2 will customarily be provided, to show the level of the water therein.

In carrying out my process in the apparatus described, the evaporator 2, being filled with water to a suitable level, is evaporated by steam from boiler 1 passed through coil 3, the evaporation being conducted at such rate as to maintain suitable pressure in the evaporator 2 and condenser 4, for example, seventy pounds above atmospheric pressure. The steam so formed passes through pipe 16 to condenser 4 where it is condensed by water from the rectifier 8 or other convenient source, and thence is delivered, from time to time, into the reboiler 6. The water condensing in coils 3 is also discharged from time to time from trap 11 into the reboiler, and so is the water from the generator 7. The heated water so discharged into the reboiler, being at a temperature above the boiling point of water at atmospheric pressure, evaporates more or less in this reboiler, carrying off the dissolved gases which, if not removed, tend to give a bad taste to the water. The water passing through coil 5 and heated as a result of passing through such coil, is delivered in part to boiler 1 as feed water, and in part to evaporator 2 as feed water.

What I claim is:—

1. The herein described method of evaporating, condensing and reboiling water, which consists in evaporating water under a pressure materially greater than atmospheric pressure, by exchange of heat from steam under pressure, and thereby condensing such heating steam, condensing under pressure greater than the atmosphere, the secondary steam produced by such evaporation, by exchange of heat with water at a temperature above ordinary atmospheric temperatures, mixing the water of condensation of the secondary steam and the water produced by condensation of the heating steam, and reducing the pressure on such water and thereby causing reboiling thereof.

2. The herein described method of evaporating, condensing and reboiling water, which consists in evaporating water under a pressure materially greater than atmospheric pressure, by exchange of heat from steam under pressure, and thereby condensing such heating steam, condensing, under pressure greater than that of the atmosphere, the secondary steam produced by such evaporation, by exchange of heat with water at a temperature above ordinary atmospheric temperatures, mixing the water of condensation of such secondary steam and the water produced by condensation of the heating steam, reducing the pressure on such water and thereby causing reboiling thereof, and delivering water heated by such condensation into proximity to the heating steam so as to cause evaporation of said water.

3. Evaporating and condensing apparatus comprising in combination an evaporator and a condenser connected together and both adapted to be operated under pressure greater than that of the atmosphere, a reboiler arranged to receive water from condenser, said evaporator having a steam conduit, and a trap arranged to receive water of condensation from said conduit, and arranged to deliver the water so condensed to said reboiler.

4. The combination with the rectifier of an absorption refrigeration apparatus, of water evaporating and condensing apparatus comprising an evaporator and a condenser connected together and adapted to be operated under pressure greater than that of the atmosphere, said condenser having a cooling conduit connected to the rectifier to receive therefrom the heated cooling water thereof.

5. The combination with the rectifier of an absorption refrigeration apparatus, of evaporating and condensing means comprising a boiler, an evaporator and a condenser connected together and both arranged to be operated under pressure greater than that of the atmosphere, said evaporator having a heating conduit to which steam is supplied by said boiler, said condenser having a cooling conduit connected to the rectifier to receive therefrom the heated cooling water thereof, such cooling conduit arranged to discharge the water heated in it to the boiler as boiler feed water.

In testimony whereof I have signed this specification in the presence of two subscribing witnesses.

NICOLAI H. HILLER

Witnesses:
FRANK ORCHARD,
E. M. HOLCOMBE.